United States Patent [19]

Turner, deceased et al.

[11] 4,041,580
[45] Aug. 16, 1977

[54] SEPARABLE LINK CONNECTOR

[75] Inventors: James Wesley Turner, deceased, late of El Centro, Calif., by Thomas M. Heim, executor; Ray E. Spinks, El Centro, Calif.

[73] Assignee: The United States of America as represented by the Secretary of the Navy, Washington, D.C.

[21] Appl. No.: 648,334

[22] Filed: Jan. 12, 1976

[51] Int. Cl.² ............................................... A44C 5/18
[52] U.S. Cl. ............................. 24/265 AL; 24/201 L; 403/154
[58] Field of Search ......... 24/73 PH, 201 L, 265 AL, 24/174, 211 K, 166; 59/87; 244/151 A; 74/245 LP, 258; 403/154, 155

[56]  References Cited

U.S. PATENT DOCUMENTS

| 475,951 | 5/1892 | Stahley | 24/166 |
| 811,391 | 1/1906 | Gates | 74/258 |
| 1,029,834 | 6/1912 | Utech | 24/166 |
| 1,064,262 | 6/1913 | Utech | 24/166 |
| 1,239,232 | 9/1917 | Taylor | 74/258 |
| 1,246,868 | 11/1917 | Bulley | 24/211 K |
| 1,646,135 | 10/1927 | Black | 59/85 |
| 2,746,116 | 5/1956 | Craven | 24/265 AL |
| 2,829,414 | 4/1958 | Thomas | 24/201 L |
| 2,839,809 | 6/1958 | Warner | 24/265 AL |
| 2,847,238 | 8/1958 | Bolling | 403/154 |
| 3,065,513 | 11/1962 | Warner | 24/265 AL |
| 3,765,064 | 10/1973 | Hoober | 24/211 K |
| 3,939,721 | 2/1976 | Koenzig | 74/258 |

Primary Examiner—Bernard A. Gelak
Attorney, Agent, or Firm—R. S. Sciascia; G. J. Rubens

[57] ABSTRACT

A separable link connector particularly suitable for detachably connecting components of a parachute harness, the connector being essentially U-shaped and having an easily removable end cap including a yoke-shaped latch member which straddles the arms of the body and enables the end cap to be locked in place by a single recessed bolt extending through the end cap and anchored in the latch member. The invention presents a more reliable and maintainable means for insuring that the removable end cap remains in place during deployment.

2 Claims, 5 Drawing Figures

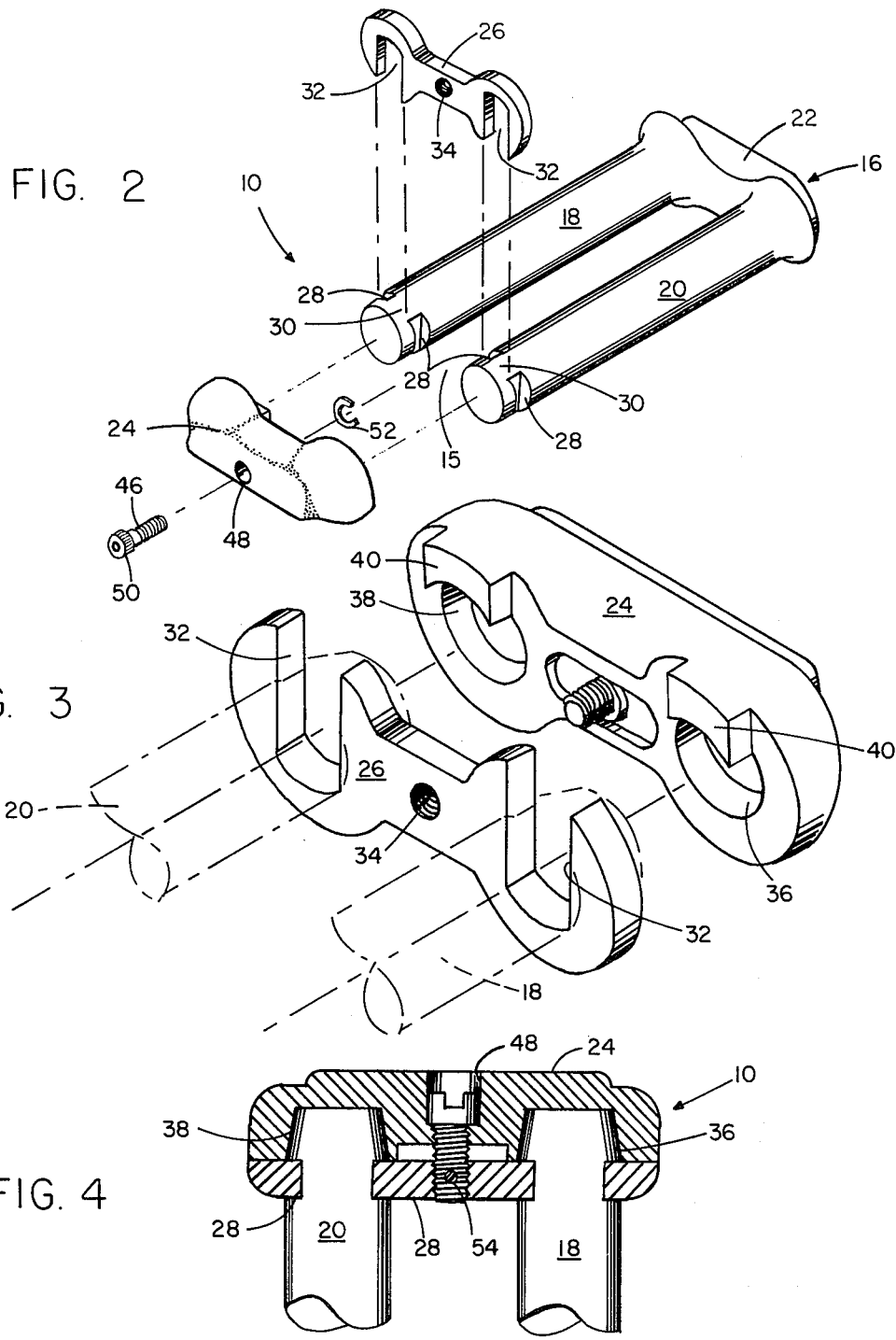

SEPARABLE LINK CONNECTOR

BACKGROUND OF THE INVENTION

A long established practice in the parachute art is the use of a detachable connector link to attach the suspension lines to a personnel parachute riser loop, or to an aircraft in the case of a drag chute. The body portion of the conventional link connector is of an elongated U-shaped construction, and has a removal end closure member secured to the arms of the body by a pair of screws, one threaded into each of the arms, the heads of the screws protruding from the end closure member at the ends thereof. No supplemental locking means for the screws is provided.

It has been found during parachute deployment, especially in the case of the drag parachute, there is a tendency for the protruding heads of the screws of the connector link to be damaged and/or loosened by vibration by dragging on the runway, which can cause the parachute to be prematurely released and loose hardware dropped on the runway or deck to be ingested by the jet engines. Furthermore, damage to the screw heads rendered ease of separation difficult, which is one of the requirements of this type of connector. As a result, U.S. Navy policy requires the replacement of the connector links at least after every five deployments.

SUMMARY OF THE INVENTION

An improved connector link is designed to overcome the shortcomings of currently deployed hardware by providing higher reliability in connector integrity and wearability. The vulnerability of the end screws to wear, which has been the source of past dificiencies, is avoided by using a latch member which straddles the ends of the arms of the connector body to provide an anchor means for an end cap member. The latch member and the ends of the body arms have complementary mating and locking surfaces. The latch and cap members are secured together by a single centrally positioned screw extending between the arms of the body member. The outer surface of cap member is recessed to an extent capable of entirely housing the head of the screw to avoid during deployment any frictional contact with the runway or carrier deck, that may otherwise damage or loosen the screw. In addition, a supplementary locking device is provided for the screw to discourage inadvertent loosening.

The end cap member is forged or otherwise formed with rounded corners to eliminate any sharp edges that might possibly snag the suspension lines of the parachute canopy, or hang up on any crevice that may exist in the runway or carrier deck. Likewise, it is preferable that only the inner side of the cap be formed with sockets to seat the ends of the mating arms or the body so as to eliminate any possibility that the arm ends will protrude beyond the surface of the outer side of the cap to create snaggable edges.

The ends of the body arms and the sockets may be formed with complementary frustrum configurations to ensure proper seating of the ends of the arms during assembly.

STATEMENT OF THE OBJECTS OF THE INVENTION

A principal object of this invention is to provide a separable link connector having improved reliability and wearability.

Another important object is to provide a supplemental locking means to maintain the integrity of the assembled connector.

Other objects, advantages and novel features of the invention will become apparent from the following detailed description of the invention when considered in conjunction with the accompanying drawings.

BRIEF DESCRIPTION OF THE DRAWINGS

FIG. 2 is a perspective exploded view of the connector components.

FIG. 3 is an opposite and inverted perspective end view of the connector components with the arms of the connector body shown in phantom lines.

FIG. 4 is a partial plan view of the connector with the cap and latch members in section.

DESCRIPTION OF THE PREFERRED EMBODIMENT

Figure 1:
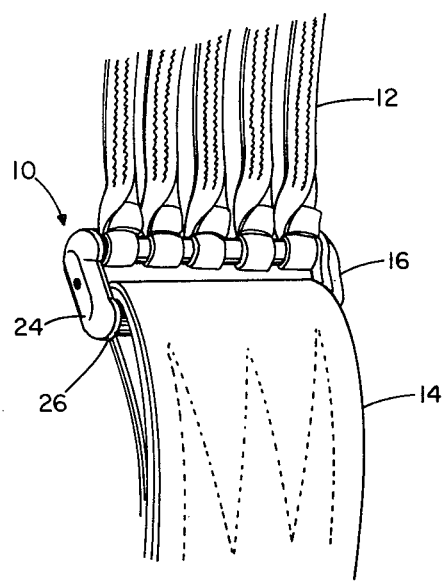
FIG. 1 is a perspective view of the novel separable connector in a fully assembled condition in one application connecting the lower end of a set of parachute suspension lines to an upper end of a parachute riser strap.

Referring to the drawings, there is shown in FIGS. 1 to 4 one modification of the novel separable connector link 10 constructed according to the present invention. Link 10 is a readily separable link connector of a type commonly used in the U.S. Navy and Air Force for connecting the lower ends of parachute suspension lines 12 to the upper looped end of a personnel parachute riser strap 14. Another common aviation use, among others, for separable link 10 is for connecting the suspension lines of a drag parachute to an aircraft.

Link 10 comprises essentially a U-shaped body frame or body 16 including a pair of parallel, cylindrical arm members 18 and 20 integrally connected together at one closed end by member 22. As is shown in FIG. 1, each free end of the arm members is designed slidably to receive one or more looped members, which can be the looped ends of suspension lines 12, riser strap 14, or the like.

The open end 15 of body 16 is adapted to be quickly opened and closed for replacement or removal of the looped members by a removable end cap member 24 that is anchored in position by a latch member 26. Latch member 26 is plate-like in construction with an end view configuration similar to cap member 24 to which it is mated.

Latch member 26 and the free ends of arm members 16 and 18 are constructed with complementary interlocking surfaces extending in a plane of connection substantially perpendicular to a plane containing the legs. Accordingly, in the specific embodiment of FIGS. 1 and 2, each arm adjacent its end is formed with a slot 28 on each side thereof creating a reduced rectangularly-shaped neck portion 30. Latch member 26 is constructed like a yoke having a pair of spaced, parallel rectangularly-shaped open slots 32, one on each side thereof, capable of snugly receiving the neck portion of the respective arm ends when the latch member is positioned to straddle the free ends of the arms. The depth of latch slots 32 are greater to a given extent than the diameter of the arm members 16 and 18 causing the latch member, when in position straddling the arms, to extend beyond the arms, as best seen in FIG. 3, and for a purpose to be described. As the neck portions 30 and slots 32 are rectangular in shape, latch member 26 can be applied to straddle the arms from either side. A single threaded hole 34 is provided centrally on latch 26 for a purpose later to be described.

End cap 24 is also constructed to straddle the free ends of arms 16 and 18, and is formed on its inner side with sockets 36 and 38, each to seat the respective ends of arms 16 and 18.

By this construction the free ends of the arms cannot protrude through and beyond the surface of the outer side of cap 24, that might otherwise create a snaggable projecting edge. Thus, cap 24, similar to integral end member 22, can be readily molded or stamped with smooth rounded edges to discourage any such hang-ups. Sockets 36 and 38, and the free ends of arm members 16 and 18 can be formed with complementary frustrum configurations (see FIG. 4) to enhance a snug seating of the arm ends into their respective sockets when assembled.

The surface of inner side of cap 24 has a pair of spaced projecting lips 40, each one adjacent each of sockets 36 and 38, which lip extends for a length substantially the thickness of latch member 26. Lips 40 are of a width and thickness to fit into the ends of slots 32 that project beyond the ends of the legs when assembled. Thus, the snugly assembled cap 24 and latch 26 have smooth sides and edges that presents no projections or recesses that may possibly catch on to a suspension line or crevices or projections that may be found in the deck or runway.

Cap 24 has a drilled hole 44 centrally extending therethrough and longitudinally aligned with latch threaded hole 34, both adapted to receive screw 46. Hole 44 has a countersunk portion 48 to cap 24 adapted to seat fully screw head 50, when the screw is tightened, to prevent scraping and damaging of head 50 on the runway or deck during deployment. Tightening of screw 46 in cap 24 with its screw end threaded in latch hole 34 anchors the cap to the latch and to the connector body.

A supplemental locking means, such as "Truac" washer 52 (FIGS. 2 and 3), nylon plug 54 (FIG. 4), or other similar common retaining means can be provided to discourage accidental loosening of screw 48 during deployment.

Figure 5:
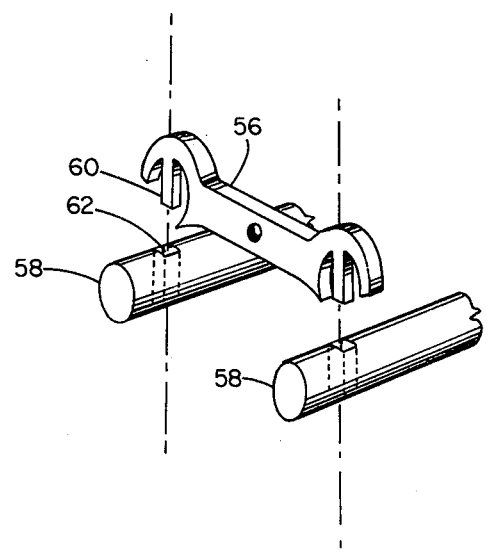
FIG. 5 is a perspective view of the connector similar to FIG. 2 but showing modified complementary mating surfaces on the latch and arm members.

FIG. 5 shows a modified set of interconnecting surfaces between latch member 56 and arm members 58 in that the former has a pair of spaced leg projections 60 adapted to engage broached openings 62 adjacent the free ends of arms 58 adjacent the end thereof.

Accordingly, the employment of the latch member as an anchor means for the cap member enables the employment of only a single screw that can be centrally positioned on the cap in a protected position against being scraped along the runway or deck during deployment. Likewise, countersinking the head of the screw prevents damage thereto to prolong its life and avoiding frequent and difficult replacement. The assembled cap and latch member is configured to have a smooth, uninterrupted outer surfaces and edges making it unlikely to hook on parachute suspension lines or catch on crevices on the deck or runway.

Obviously many modifications and variations of the present invention are possible in the light of the above teachings. It is therefore to be understood that within the scope of the appended claims the invention may be practiced otherwise than as specifically described.

We claim:

1. A separable link connector for aircraft landing drag chutes subject to abrasive and vibrational contact with a runway surface comprising:

a body including a pair of parallel spaced arm members and an end member forming an open-ended integral U-shaped body;

said members having a free end; detachable closure means including a latch member straddling the ends of arm members and having a centrally located threaded hold, said latch member and arm ends having complementary interlocking shoulder surfaces lying in a plane of connection perpendicular to said common plane, said closure means including an end cap member separate from said latch member and having sockets housing and completely enclosing the free ends of the respective arm members, extending through said cap member and into said threaded hole a single screw centrally located on the cap member said latch member positioned adjacent and against said cap member facing said arm members, for securing together the end cap member and the latch member;

supplemental means for locking said screw to the latch member; and whereby said cap member will protect the entire free end of the screw to prevent its engagement with the landing runway.

2. The connector of claim 1 wherein said latch member is yoke shaped having a pair of flat-sided slotted openings, the ends of the arms being formed with flat-sided reduced neck portions complementary to said slotted openings whereby the maximum frictional engagement is provided between the interlocking surfaces;

said end cap member having a pair of arcuate projections, each adapted to fit into the open end of the slot sections that protrude beyond the ends of the arms when the connector is assembled.

* * * * *

UNITED STATES PATENT AND TRADEMARK OFFICE
CERTIFICATE OF CORRECTION

PATENT NO. : 4,041,580
DATED : August 16, 1977
INVENTOR(S) : James Wesley Turner, deceased, and Ray E. Spinks It is certified that error appears in the above-identified patent and that said Letters Patent are hereby corrected as shown below:

Claim 1 as appears in the above patent is garbled, and the underscored portions in corrected typed claim 1 below represents either omitted language or misplaced language.

Claim 1 - A separable link connector for aircraft landing drag chutes subject to abrasive and vibrational contact with a runway surface comprising:

a body including a pair of parallel spaced arm members and an end member forming an open-ended integral U-shaped body;

said members lying in a common plane;

each of said arm members having a free end; detachable closure means closing said open-ended body, said closure means including a latch member straddling the ends of arm members and having a centrally located threaded hole, said latch member and arm ends having complementary interlocking shoulder surfaces lying in a plane of connection perpendicular to said common plane, said closure means including an end cap member separate from said latch member and having sockets housing and completely enclosing the free ends of the respective arm members, said latch member positioned adjacent

UNITED STATES PATENT AND TRADEMARK OFFICE
CERTIFICATE OF CORRECTION

PATENT NO. : 4,041,580

DATED : August 16, 1977

INVENTOR(S) : James Wesley Turner, deceased, and Ray E. Spinks

It is certified that error appears in the above-identified patent and that said Letters Patent are hereby corrected as shown below:

<u>and against said cap member facing said arm members,</u> a single screw centrally located on the cap member <u>extending through said cap member and into said threaded hole</u> for securing together the end cap member and the latch member;

supplemental means for locking said screw to the latch member; and whereby said cap member will protect the entire free end of the screw to prevent its engagement with the landing runway.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*